United States Patent
Logan

(10) Patent No.: US 7,055,563 B2
(45) Date of Patent: Jun. 6, 2006

(54) FOLDING TABLE

(75) Inventor: J Richard Logan, Oxford, MI (US)

(73) Assignee: Tapco International Corporation, Plymouth, MI (US)

( * ) Notice: Subject to any disclaimer, the term of this patent is extended or adjusted under 35 U.S.C. 154(b) by 0 days.

(21) Appl. No.: 11/009,614

(22) Filed: Dec. 10, 2004

(65) Prior Publication Data

US 2005/0098232 A1 May 12, 2005

Related U.S. Application Data

(60) Division of application No. 10/715,811, filed on Nov. 18, 2003, now Pat. No. 6,854,495, which is a continuation of application No. 10/022,984, filed on Dec. 17, 2001, now Pat. No. 6,705,192.

(60) Provisional application No. 60/267,549, filed on Feb. 9, 2001.

(51) Int. Cl.
*B25H 1/02* (2006.01)
*A47B 3/08* (2006.01)

(52) U.S. Cl. .................. 144/286.5; 144/287; 108/127; 108/132; 83/469

(58) Field of Classification Search ................ 83/469, 83/471, 471.1–471.3, 477, 477.1, 477.2, 83/472–474; 144/286.1, 287, 286.5; 108/127, 108/132; 182/181.1, 181.3, 181.5, 181.6; 248/166, 439, 188.6; 269/401
See application file for complete search history.

(56) References Cited

U.S. PATENT DOCUMENTS

| | | | |
|---|---|---|---|
| 3,130,758 A | 4/1964 | McKinley | |
| 4,191,111 A * | 4/1964 | Emmert | 108/132 |
| 3,872,755 A * | 3/1975 | Marsh et al. | 83/471.3 |
| 4,197,775 A | 4/1980 | Handler et al. | |
| 4,327,619 A | 5/1982 | McNamee, Jr. | |
| 4,452,117 A * | 6/1984 | Brickner et al. | 83/468 |
| 5,080,152 A * | 1/1992 | Collins et al. | 144/154.5 |
| 5,404,779 A | 4/1995 | Break | |
| 5,421,231 A | 6/1995 | Break et al. | |
| 5,473,968 A | 12/1995 | Break et al. | |
| 5,651,298 A | 7/1997 | Break et al. | |
| 5,899,132 A | 5/1999 | Break et al. | |
| 5,921,623 A | 7/1999 | Nye et al. | |
| 5,941,175 A | 8/1999 | Bannister | |
| 6,044,775 A * | 4/2000 | Lashlee et al. | 108/132 |
| 6,076,472 A * | 6/2000 | Lloyd | 108/36 |
| 6,108,841 A | 8/2000 | Cameron et al. | |
| 6,112,674 A | 9/2000 | Stanford | |
| 6,120,397 A | 9/2000 | Julian | |
| 6,168,227 B1 * | 1/2001 | Lofting | 296/156 |

* cited by examiner

*Primary Examiner*—Derris H. Banks
*Assistant Examiner*—Shelley Self
(74) *Attorney, Agent, or Firm*—Howard & Howard

(57) ABSTRACT

A collapsible table assembly having improved portability. A mechanism interconnects the table and supporting legs for moving the legs between a diverging supporting position, a folding position, and a storage position. A saw track assembly includes an upper platform for receiving a cutting device and a lower platform for supporting a workpiece during cutting connected to the upper platform. Each of the upper and lower platform are disposed above the table. A guide pin pivotally attaches the saw track to the table for allowing the saw track to pivot through a plane parallel to the table. A plurality of material supports supported by the table rotate between a first material supporting position for supporting a workpiece and a second unobstructing position for allowing the saw track to freely pivot through the plane without contacting the material supports.

12 Claims, 9 Drawing Sheets

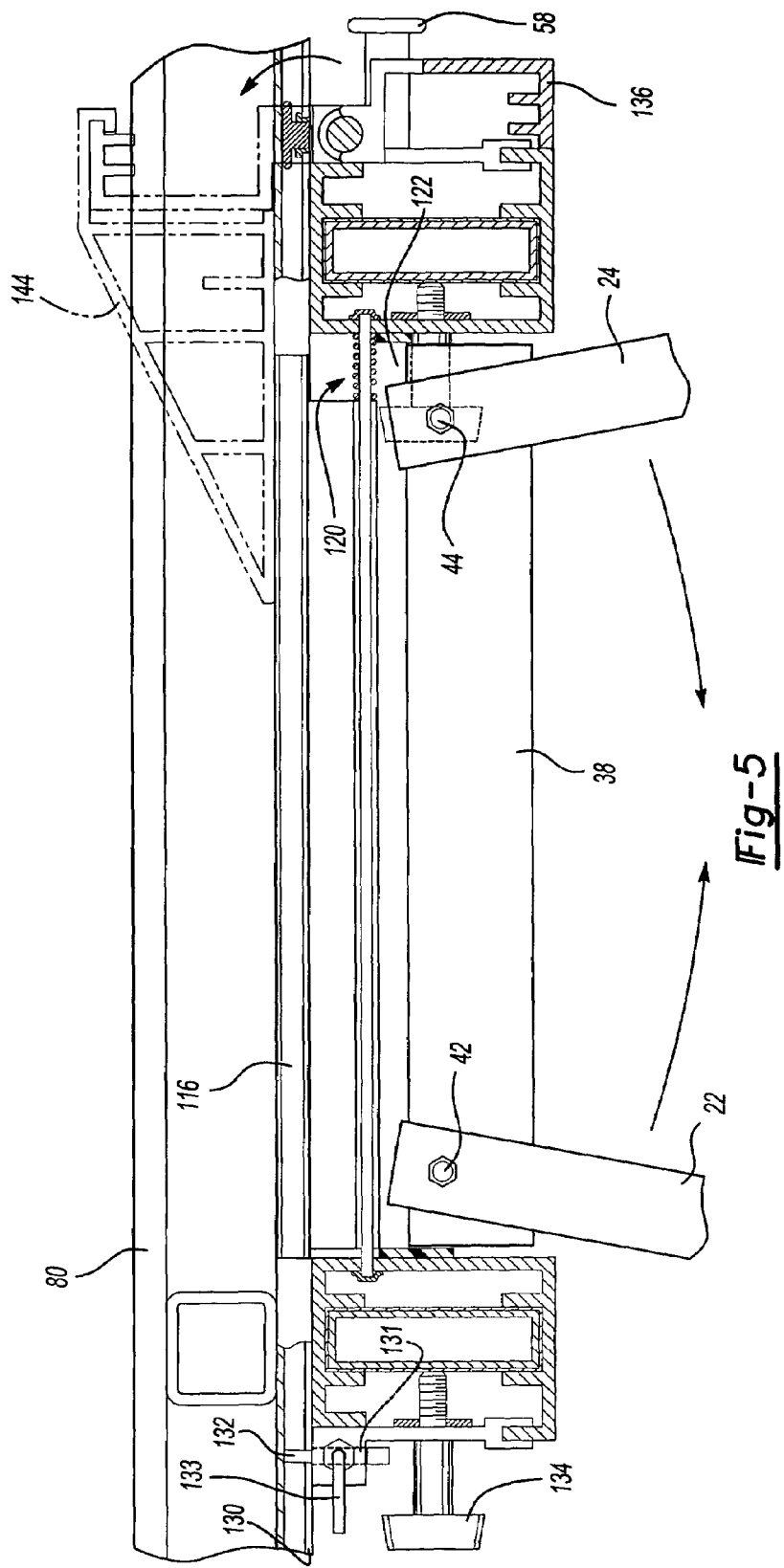

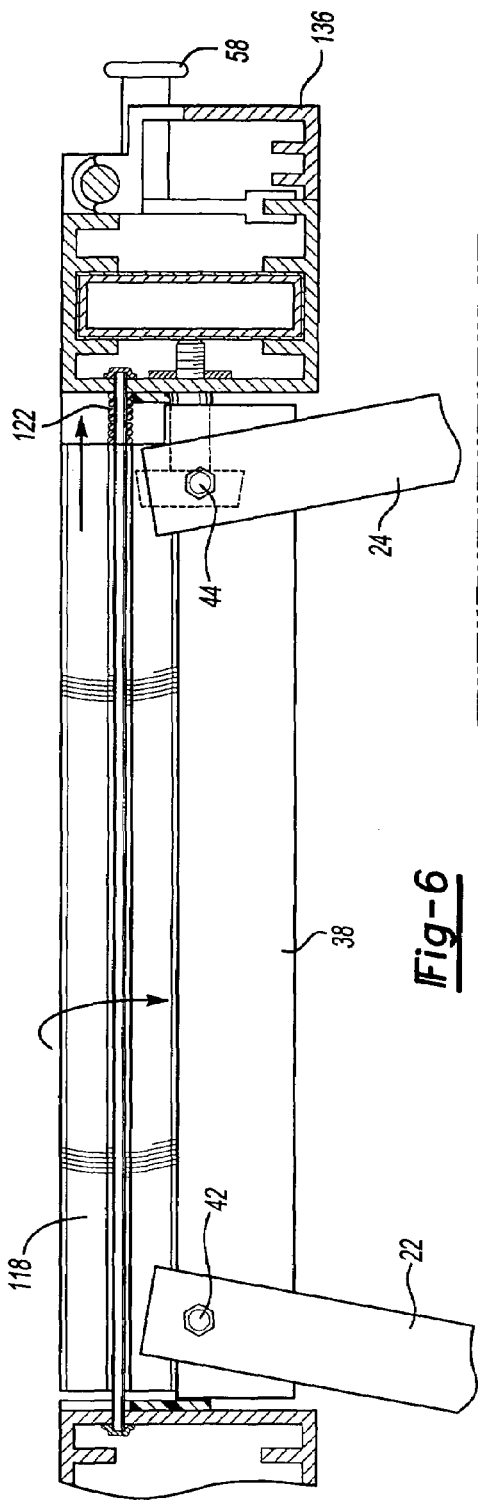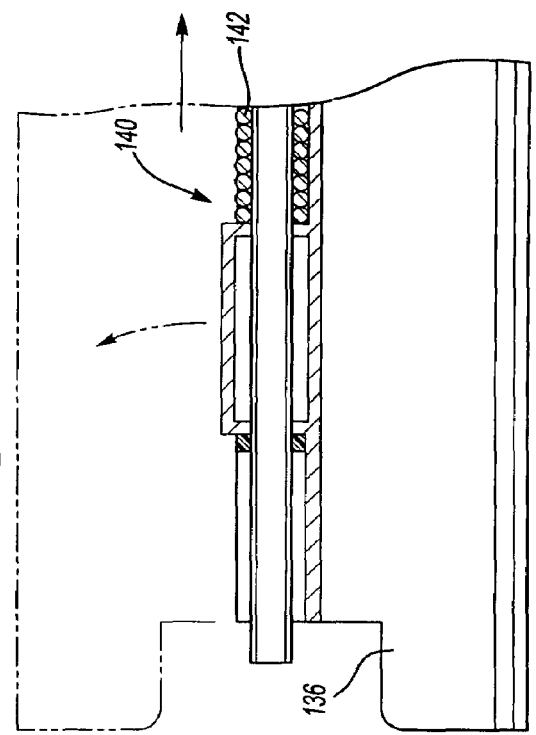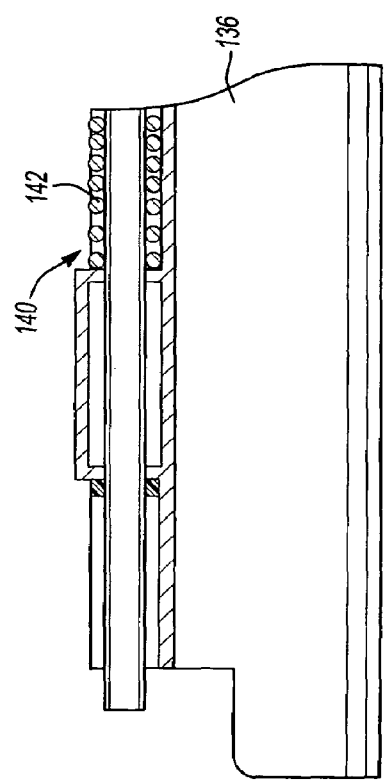

FOLDING TABLE

This application is a divisional of application Ser. No. 10/715,811, filed Nov. 18, 2003, now U.S. Pat. No. 6,854,495, which is a continuation of application Ser. No. 10/022,984, filed Dec. 17, 2001 now U.S. Pat. No. 6,705,192, which claims the benefit of Provisional Application Ser. No. 60/267,549, filed Feb. 9, 2001.

BACKGROUND OF THE INVENTION

1. Field of the Invention

The subject invention relates to collapsible portable saw tables for supporting a cutting device and a workpiece during cutting.

2. Description of the Prior Art

Portable saw tables that can be transported to a job site and used are well known as shown, for example, in U.S. Pat. Nos. 3,872,755, 4,197,775, 4,452,117, 5,080,152, and 5,473,968.

A typical collapsible saw table is light in weight and easily manipulated, and comprises a table base with a plurality of leg support assemblies for supporting a workpiece, a saw track which pivots by some means about the table base, and a slide movable longitudinally along the table base. The saw track supports a portable saw or router for cutting, and typically attaches to the table base at a pivot point and at the slide, thereby allowing the saw track to pivot to multiple cutting angles as the slide moves along the base.

The legs attached to the table base of some folding saw tables do not provide adequate support for the table, resulting in the instability of the table during cutting. The table base typically contains multiple material support crossbars; however, a board or other item that requires periodic replacement must also be used if complete material support is desired. Typical collapsible saw tables used for cutting large workpieces are generally very heavy and are not easily portable making it difficult to transfer the table from one work site to another.

SUMMARY OF THE INVENTION AND ADVANTAGES

In accordance with one form of the present invention, a collapsible table assembly having improved portability is provided having a table with a periphery and a pair of first and second legs for supporting the table. A mechanism interconnects the legs and the table for moving the legs between a diverging supporting position, a folding position, and a storage position wherein the legs are disposed within the table periphery.

In another aspect of the invention, a saw track assembly is provided for use with a saw table including an upper platform for receiving a cutting device and a lower platform connected to the upper platform for supporting a workpiece during cutting, wherein the upper and lower platforms are disposed above the table.

In a further aspect of the invention, a periphery has a front rail and a rear rail spaced from the front rail and interconnected to the front rail by a plurality of cross-members. A saw track includes the upper and lower platforms. A guide pin disposed on the rear rail pivotally attaches the saw track to the rear rail, thereby allowing the saw track to pivot through a plane parallel to the periphery. A plurality of material supports are supported by and extend between the front and rear rails for rotating between a material supporting position for supporting a workpiece and an unobstructing position for allowing the saw track to freely pivot through the plane without contacting the material supports.

The mechanism interconnecting the legs and the table allows the legs to adequately support the table during cutting, resulting in increased table stability as compared to other collapsible saw tables. Using the lower platform of the saw track to support the workpiece eliminates the need for a board to provide material support and also minimizes the need for a table top which greatly reduces the overall weight of the table and increases ease of portability. The moveable material supports further minimize the need for a table top while allowing the saw track to pivot freely to a desired cutting angle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a cross-sectional view of the collapsible table assembly showing a locking spring in an uncompressed position;

FIG. 6 is a cross-sectional view of the collapsible table assembly showing the locking spring in a compressed position;

FIG. 7 is a fragmentary cross-sectional view of a material guide showing a guide spring in an uncompressed position;

FIG. 8 is a fragmentary cross-sectional view of the material guide showing the guide spring in a compressed position;

DETAILED DESCRIPTION OF THE PREFERRED EMBODIMENT

Figure 1:
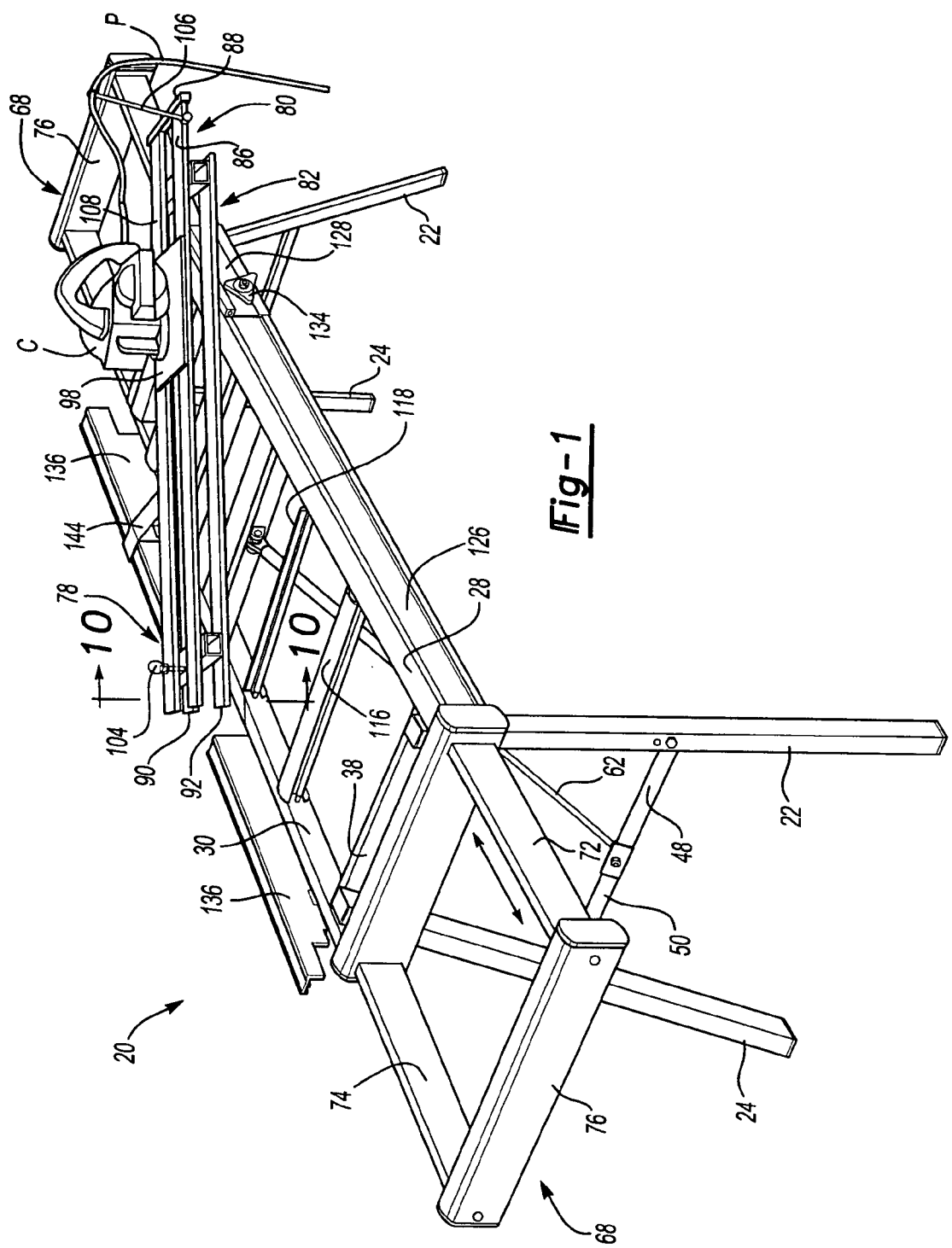
FIG. 1 is a perspective view of a collapsible table assembly with legs in a supporting position and a saw track attached.

Referring to the drawings, a collapsible table assembly is generally shown at 20, having improved portability and including a pair of first 22 and second 24 legs in a diverging supporting position and generally shown at 26. The table 20 includes a front rail 28 and a rear rail 30 spaced from the front rail 28, with the rails 28 and 30 interconnected by a plurality of cross-members 32 to define a periphery generally shown at 34. A mechanism, generally shown at 36 (FIGS. 3 and 4), connects each pair of legs 22, 24 to the table 20. The mechanism 36 includes a support 38 rotatably attached to the front rail 28 and to the rear rail 30 such that the support 38 rotates about a horizontal connecting axis 40. A first pivot 42 (FIG. 5) connects the first leg 22 to the support 38, while a second pivot 44 connects the second leg 24 to the support 38, thereby allowing the first and second legs 22, 24 to pivot about the first and second pivots 42, 44. A foldable linkage, generally indicated at 46 (FIGS. 3 and 4), includes a first link 48 pivotally attached to the first leg 22 and a second link 50 pivotally attached to the second leg 24. A fastener 52 pivotally connects the first and second links 48, 50, which, in turn, interconnect the first and second legs 22, 24.

Figure 4:
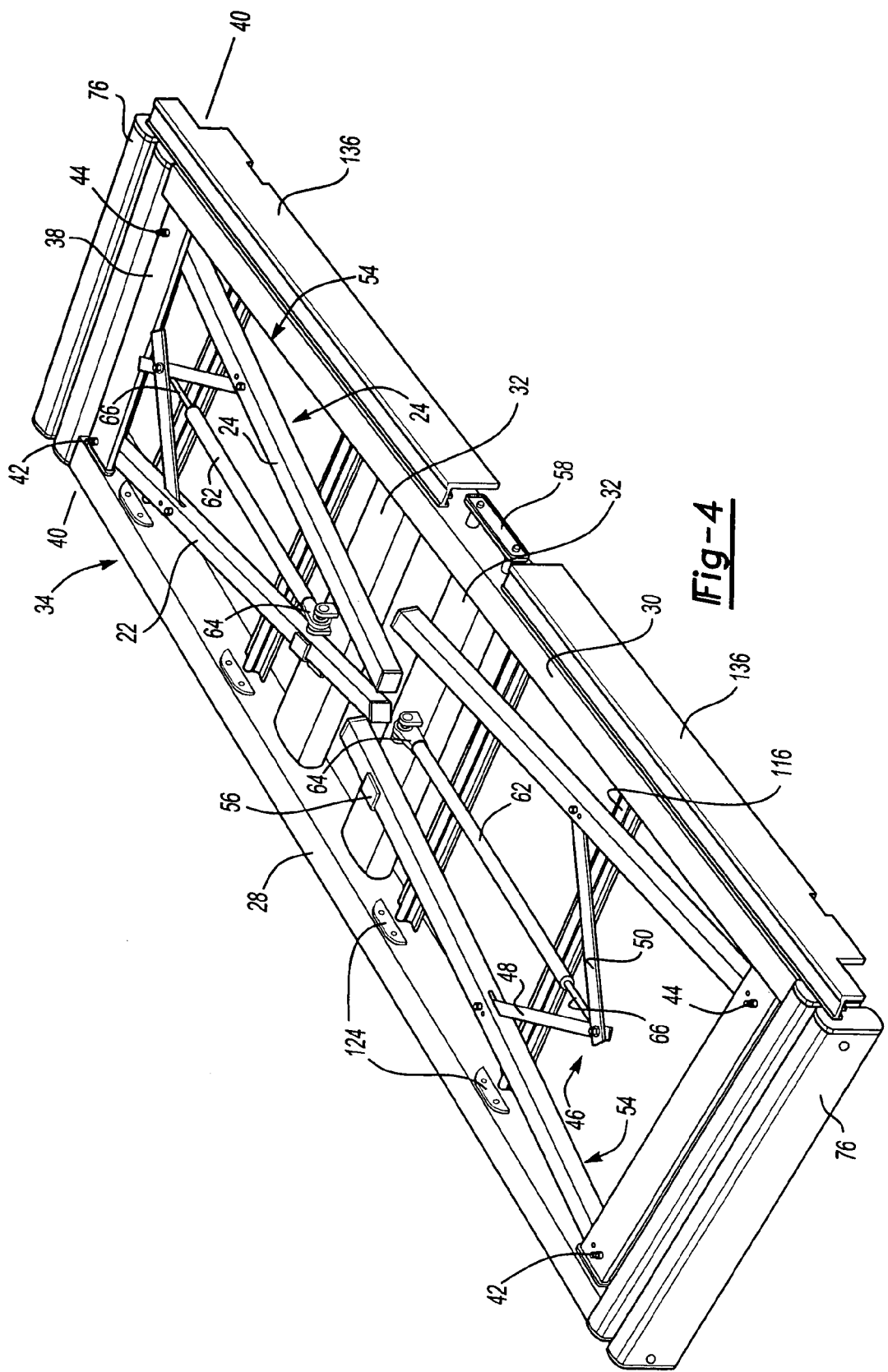
FIG. 4 is a perspective view of the bottom of the collapsible table assembly with both pair of legs in the storage position.

A storage position is shown at 54 in FIG. 4 wherein the first and second legs 22, 24 are disposed within the periphery 34 of the table 20, i.e., within the edges or confines of the rails 28 and 30. A leg lock 56 holds the legs in place in the storage position 54 such that the legs 22, 24 are immobile while the leg lock 56 is engaged. In the preferred embodiment, the leg lock 56 comprises a substantially L-shaped member attached to one of the plurality of cross-members 32 such that the first leg 22 nestles within the leg lock 56 to maintain the storage position 54. However, it should be appreciated that another device could function as a leg lock 56 for keeping the legs 22, 24 in the storage position 54. A handle 58 is disposed on the rear rail 30 for carrying the table 20 while in the storage position 54.

Figure 3:
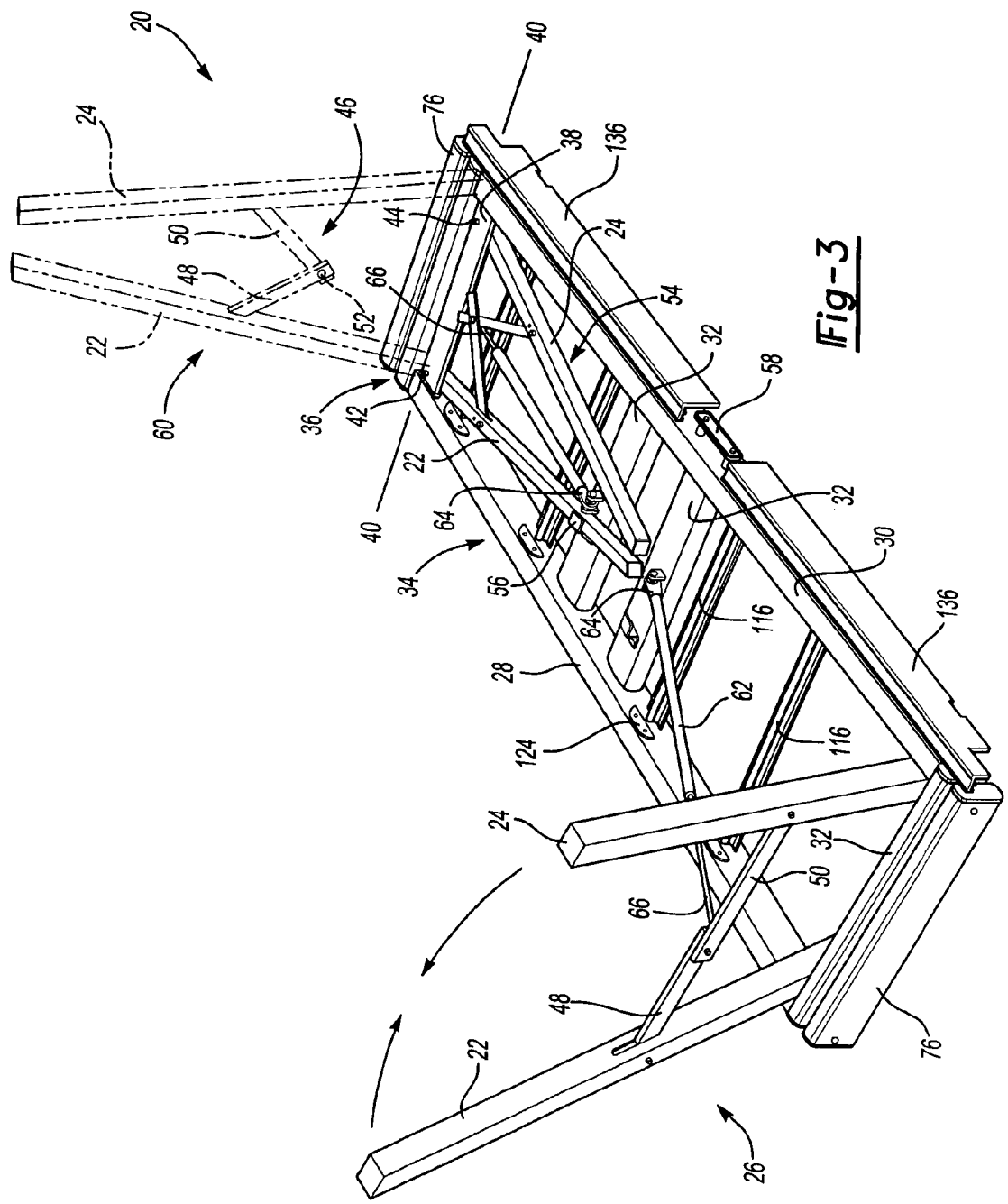
FIG. 3 is a perspective view of the rear bottom of the collapsible table assembly with one pair of legs in the supporting position, one pair of legs in a storage position and a shadowed view of one pair of legs in a folding position.

A folding position, as shown generally in phantom at 60 in FIG. 3, results when the support 38 rotates from the storage position 54 about the connecting axis 40 such that the first and second legs 22, 24 are substantially perpendicular to the periphery 34. From the folding position 60, the first and second legs 22, 24 pivot in a plane that includes the connecting axis 40, thereby diverging from one another to form the diverging supporting position 26. The foldable linkage 46 limits the outward or diverging pivoting movement of the legs 22, 24, thereby maintaining the diverging supporting position 26 by preventing the legs 22, 24 from overrotating. A strut 62 includes a first end 64 pivotally attached to the table 20 at one of the plurality of cross-members 32, and extends to a second end 66 pivotally attached to the foldable linkage 46. The strut 62 further maintains the diverging supporting position 26 by limiting rotation of the support 38. It should be appreciated that the strut 62 could also attach to the legs 22, 24 or another part of the table 20.

As shown in FIG. 1, the preferred embodiment includes a pair of telescoping extensions shown generally at 68 for extending the table 20 as necessary to support a workpiece W. Each extension 68 comprises a pair of telescoping members 72, 74 housed within the front rail 28 and rear rail 30 respectively. A connecting handle 76 interconnects the telescoping members 72, 74. To use the telescoping extension 68, the connecting handle 76 is pulled to achieve a desired table length.

Figure 10:
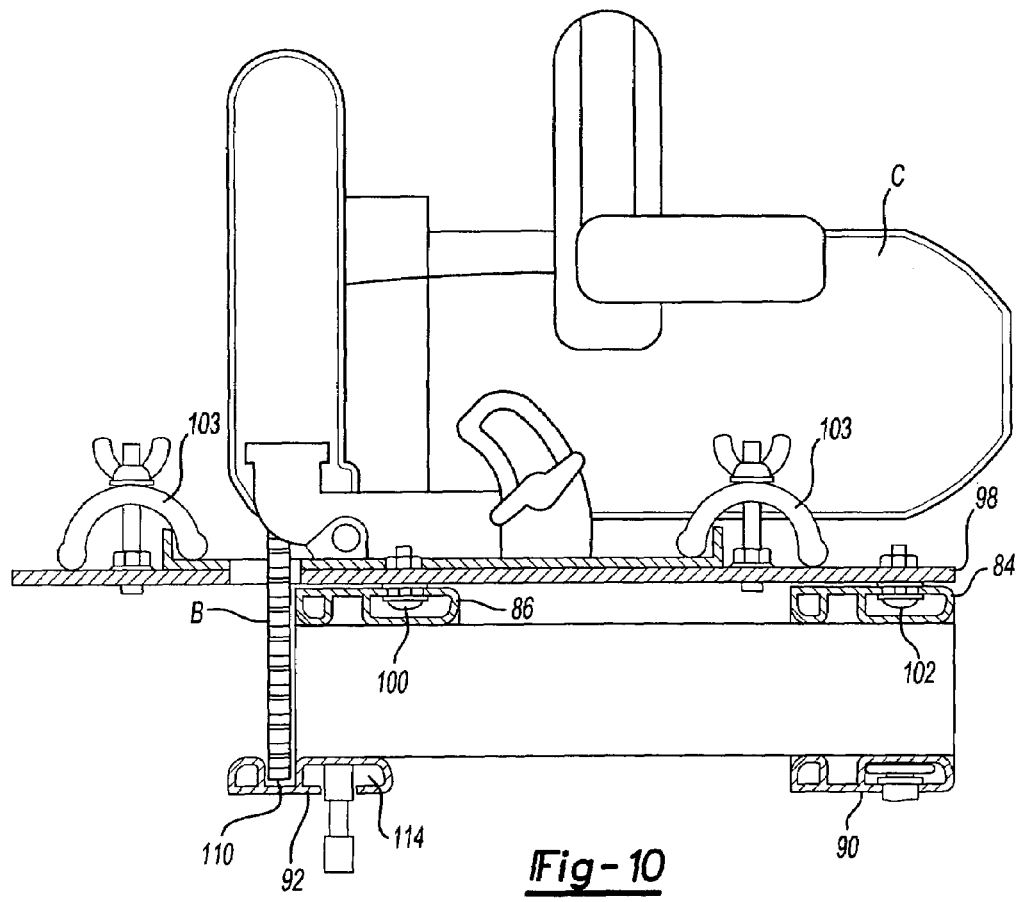
FIG. 10 is a cross-sectional view of the saw track with a cutting device attached.

A saw track assembly is generally shown at 78 for use with a saw table. The saw track 78 includes an upper platform 80 for receiving a cutting device C and a lower platform 82 spaced from and connected to the upper platform 80 for supporting a workpiece W (shown in phantom in FIG. 11) during cutting. The upper platform 80 and the lower platform 82 are disposed above the table 20. In the preferred embodiment, shown in FIGS. 1 and 10, the upper platform 80 comprises a first member 84 and a second member 86 spaced from the first member 84 attached by an upper connecting member 88. Similarly, the lower platform 82 comprises a first support rail 90 and a second support rail 92 spaced from the first support rail 90. In a second embodiment, shown in FIGS. 11 and 12, the upper platform 80 comprises only a first member 84, while the lower platform 82 includes both the first and second support rails 90, 92.

Figure 11:
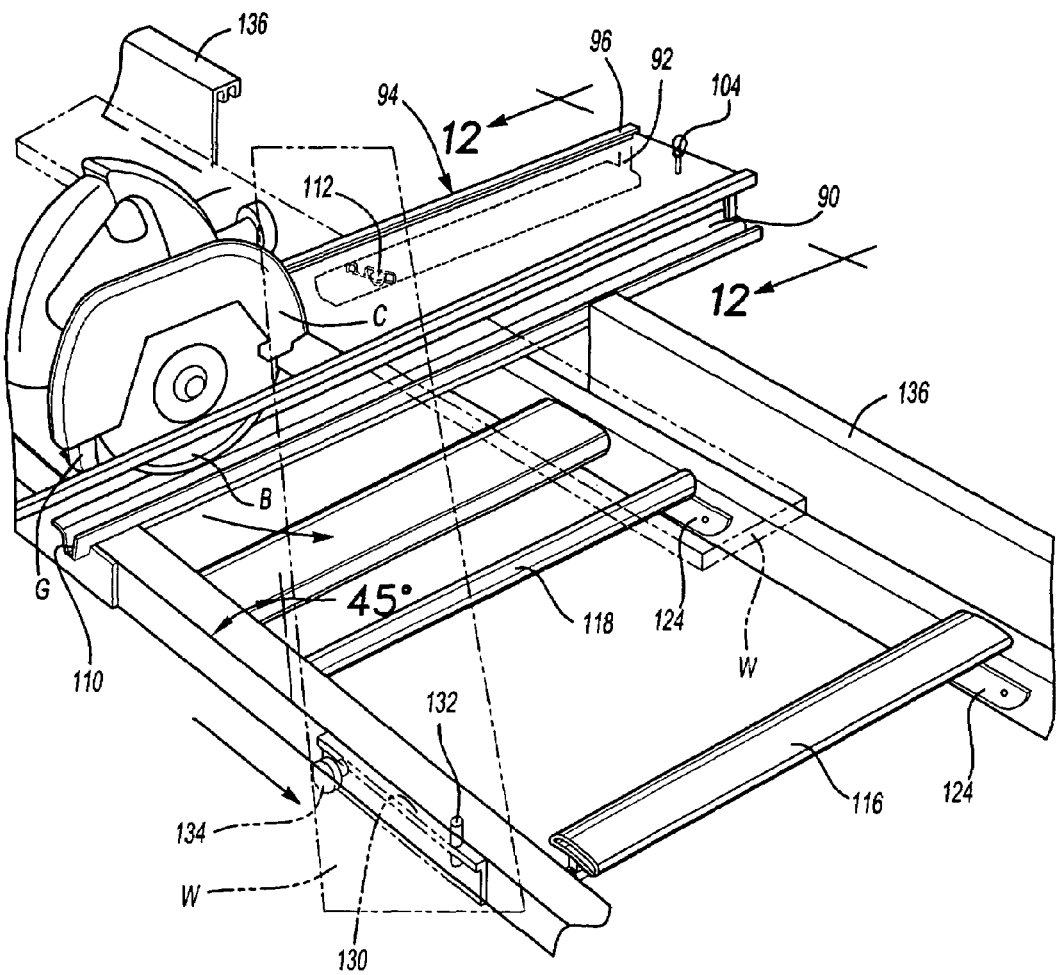
FIG. 11 is a fragmentary perspective view of the second embodiment of the saw track.
Figure 12:
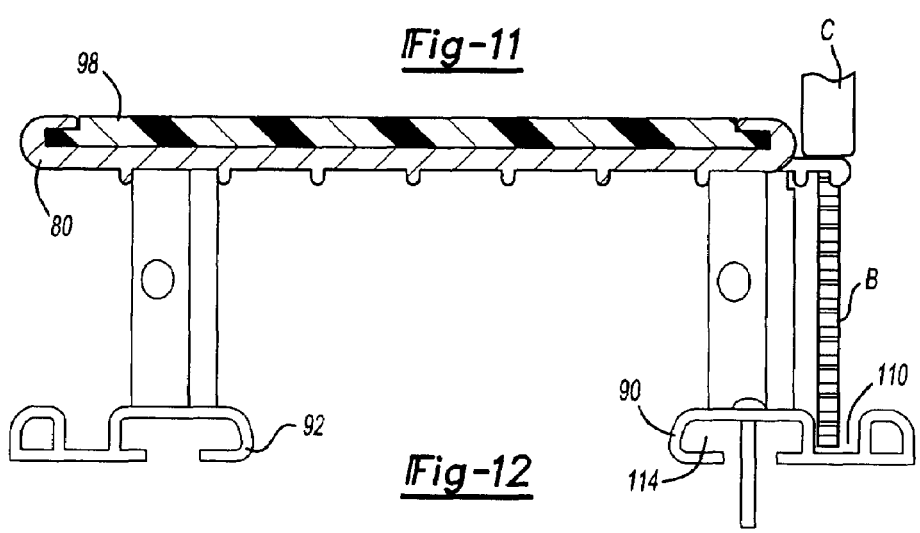
FIG. 12 is a fragmentary perspective view of the table assembly with a second embodiment of the saw track attached.
Figure 13:
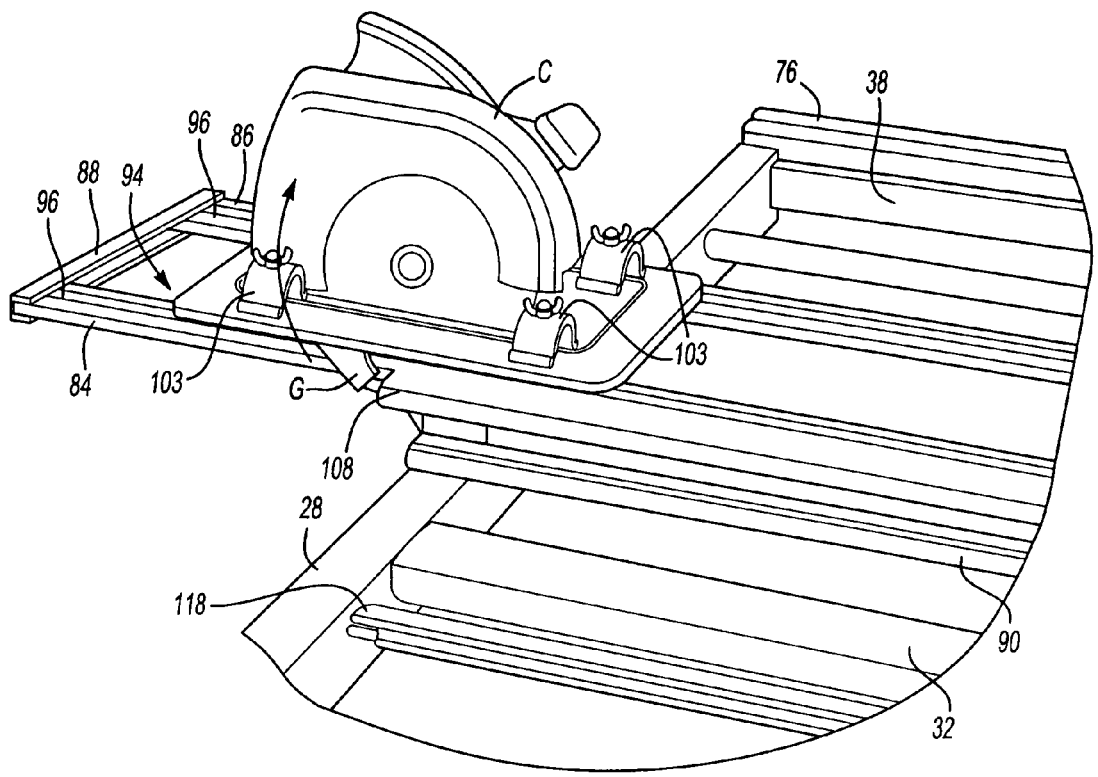
FIG. 13 is a fragmentary perspective view of the table assembly showing an extension of the saw track just prior to engaging a saw guard of the cutting device.

The upper platform 80 includes a guide shown generally at 94 in FIGS. 11 and 13 for receiving the cutting device C. The guide 94 comprises at least one longitudinal channel 96. A connection plate 98 fits within the longitudinal channel 96 and slides along the upper platform 80. In the preferred embodiment (FIG. 13), a longitudinal channel 96 is disposed within each of the first and second members 84, 86. A pair of first bolts 100 and second bolts 102 extend through the connection plate 98 and fit within each longitudinal channel 96 allowing the connection plate 98 to slide along the upper platform. A plurality of clamps 103 attach the cutting device C to the connection plate 98 such that the cutting device slides with the connection plate 98 along the upper platform 80. The upper connection member 88 prevents the connection plate 98, and thus the attached cutting device C, from escaping the upper platform 80 in a direction closest to a user during cutting. A security pin 104 disposed within the upper platform 80 prevents the connection plate 98 from escaping the upper platform 80 in a direction furthest from the user during cutting. The second embodiment (FIG. 11) includes a pair of longitudinal channels 96 disposed within the outer edges of the upper platform 80. The cutting device C permanently attaches to the connection plate 98 such that a different connection plate 98 is required for each different cutting device C. The edges of the connection plate 98 nestle within the longitudinal channels 96 allowing the connection plate 98 and the attached cutting device C to slide along the upper platform 80. In the second embodiment, a pair of security pins 104 at each end of the upper platform 80 prevent the connection plate 98 and the cutting device C from escaping the upper platform 80 during cutting. To change cutting devices, either security pin 104 is removed and the connection plate 98 and associated cutting device C slide off of the upper platform 80. Similarly, a new connection plate 98 and associated cutting device C slide onto the upper platform 80.

Figure 14:
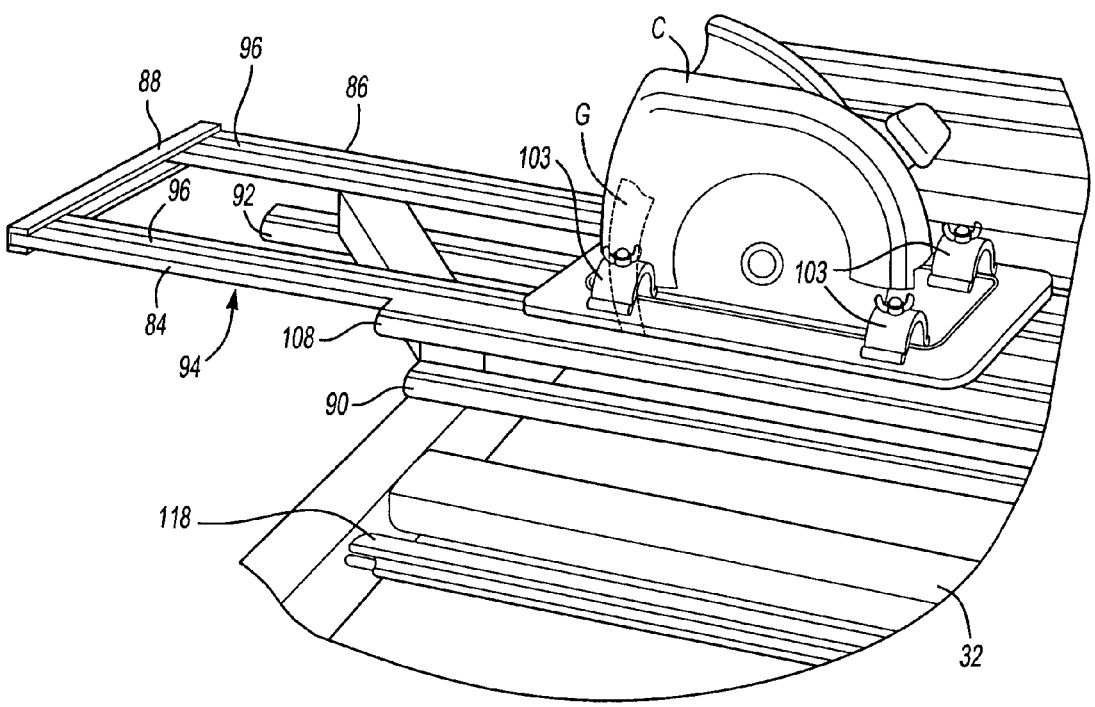
FIG. 14 is a fragmentary perspective view of the table assembly showing the extension maintaining a blade of the cutting device in an exposed condition.

A stowable cord support 106 is disposed on the upper platform 80 and prevents accidental cutting of an electrical power cord P on the cutting device C during cutting. An extension 108 connected to the upper platform 80, best shown in FIGS. 13 and 14, engages a saw guard G from the cutting device C to expose the blade B as the cutting device C slides along the upper platform 80. In the preferred embodiment, the extension 108 is integrally formed with the upper platform 80. However, other embodiments are conceivable. A blade groove 110 (FIG. 7) in the first support rail 90 of the lower platform 82 surrounds the blade B of the cutting device C during cutting such that the blade B does not contact the lower platform 82.

Figure 2:
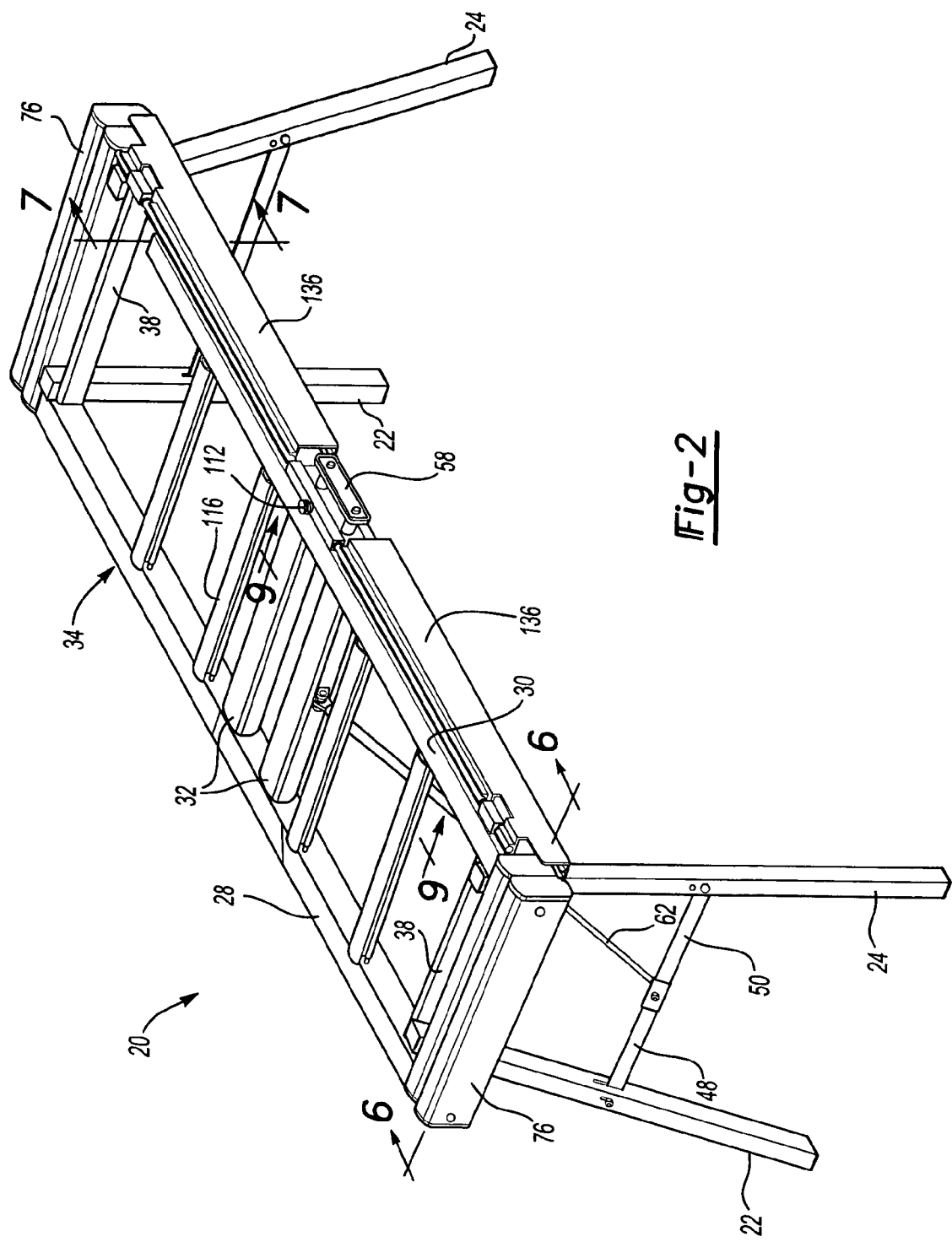
FIG. 2 is a perspective view of the rear of the collapsible table assembly with legs in a supporting position.

A guide pin 112 (FIG. 2) protrudes from the rear rail 30 for attaching the saw track 78 to the table 20 and for allowing the saw track 78 to pivot in a horizontal plane parallel to the periphery 34. The lower platform 82 includes an attachment groove 114 (FIGS. 12 and 14), preferably disposed within the first support rail 90. The guide pin 112 nestles within the attachment groove 114 such that the lower platform 82 pivots around and moves longitudinally along the guide pin 112 as the saw track 78 pivots through the plane. It should be understood that the attachment groove 114 could also be a slot cut into a one-piece lower platform or other such device.

Figure 9:
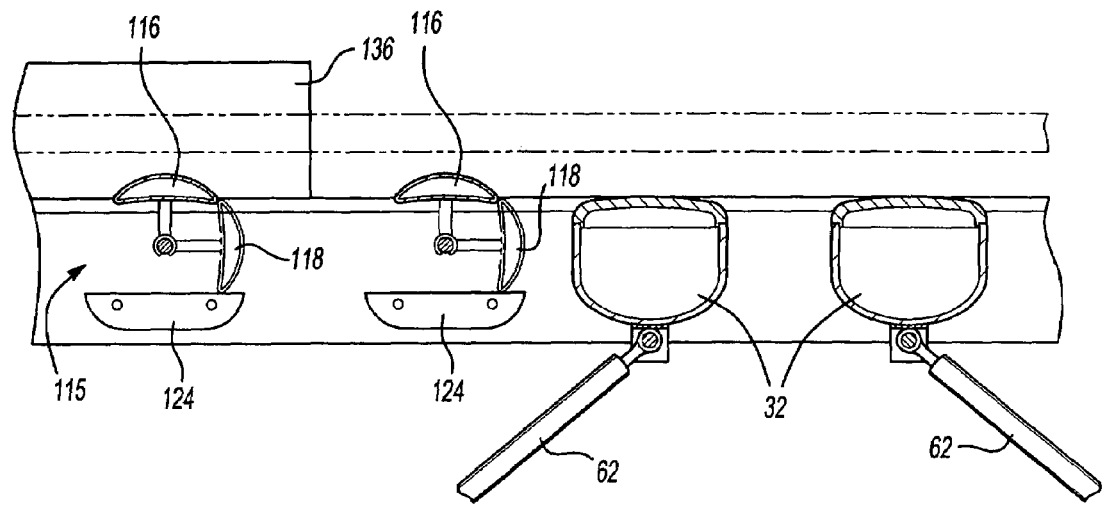
FIG. 9 is a cross-sectional view of the collapsible table assembly showing two cross-members with struts attached and two material support cross-bars.

A plurality of material supports 115 are supported by and extend between the front and rear rails 28, 30. Using one or more material supports 115 in conjunction with the lower platform 82 allows full support of a workpiece W without a tabletop, thereby greatly reducing the bulk of the table 20 and significantly increasing portability. As shown in FIG. 9, each material support 115 rotates between a material supporting position 116, and an unobstructing position, 118. In the material supporting position 116, a portion of the material support 115 protrudes above the periphery 34. In the unobstructing position 118, shown in phantom in FIG. 9, the material support 115 is disposed within or below the plane of the periphery 34, thereby allowing the saw track 78 to pivot freely through the plane. A material support lock 120 engages each material support 115 to prevent rotation until movement from the material supporting position 116 to the unobstructing position 118 is desired. In the preferred embodiment, the material support lock 120 comprises a locking spring 122 moveable between an uncompressed position, as shown in FIG. 5, and a compressed position, as shown in FIG 6. In the locked material supporting position 116, the locking spring 122 rests in the uncompressed position. To rotate the material support 115 the locking spring 122 is compressed by pushing the material support 115 toward the rear rail 30, thereby disengaging the material support lock 120. The material support 115 then rotates downward to the unobstructing position 118. When the material support 115 is released, the locking spring 122 returns to the uncompressed position. A material support stop 124 engages each material support 115 to maintain the unobstructing position. In the preferred embodiment, the material support stop 124 is disposed on the rear rail 30 such that the material support 115 rests thereon while in the unobstructing position 118.

As best shown in FIG. 1, the front rail 28 includes a slide channel 126 for receiving a slide 128. Preferably, the slide 128 includes a flange (not shown) disposed within the slide channel 126 for sliding the slide 128 along the front rail 28. A track plate 130 pivotally connects the saw track 78 to the slide 128 for pivotal movement in the horizontal plane. As best shown in FIG. 5, the slide 128 in the preferred embodiment includes an aperture 131 for receiving a connection pin 132 to secure the saw track 78 to the slide 128. A spring-loaded pin 133 fits horizontally within the aperture for restricting entry of the connection pin. The spring-loaded pin engages the spring to clear the aperture, thereby allowing the connection pin to enter. As the slide 128 moves along the slide channel 126, the saw track 78 pivots relative to the table 20 to various angles. The lower platform 82 moves around the guide pin 112 such that the saw track 78 remains fixed to the slide 128 at the track plate 130. A slide lock 134 is disposed on the slide 128 for preventing movement of the slide 128 within the slide channel 126 to maintain the slide track 78 at a desired angle during cutting. The slide lock 134 rotates to tighten into sufficient frictional engagement with the front rail 28 to prevent the sliding movement.

Referring now to FIGS. 7 and 8, the table 20 further includes a pair of material guides 136 spaced longitudinally apart from one another and each hingedly attached to the rear rail 30. Each material guide 136 moves between a guiding position, shown in FIG. 7, and a quiescent position, shown in phantom in FIG. 8. In the guiding position, the material guide 136 projects above the periphery 34 and provide lateral support during cutting as a workpiece W rests thereagainst. In the quiescent position, the material guide 136 lies flush against the rear rail 30. A material guide lock 140 engages the material guide 136 to prevent rotation until movement from the quiescent position to the guiding position is desired. In the preferred embodiment, the material guide lock 140 comprises a guide spring 142 moveable between an uncompressed position, as shown in FIG. 7, and a compressed position, as shown in FIG. 8. To rotate the material guide 136, the guide spring 142 is compressed by pushing the material guide 136 along the rear rail 30 toward the guide spring 142 until the guide spring 142 reaches the compressed position. The material guide 82 then rotates upward to the guiding position. To maintain the guiding position, the guide spring 142 is released to the uncompressed position. Movement of the material guide 136 is only possible when the guide spring 142 is in the compressed position. A ruler or a protractor may be attached to the material guide 136 or to the rear rail 30 for further assistance during cutting. A material stop 144 (FIG. 5) attaches to the rear rail 30 or one of the material guides 136 to further maintain the position of the workpiece W during cutting.

Obviously, many modifications and variations of the present invention are possible in light of the above teachings. The invention may be practiced otherwise than as specifically described within the scope of the appended claims.

What is claimed is:

1. A collapsible table assembly having improved portability, said assembly comprising:
   a table having a periphery;
   a first pair of legs and a second pair of legs spaced apart from one another and moveable between a storage position defined within said periphery and a supporting position for supporting said table having said pair of legs extending downwardly from said periphery;
   each of said pair of legs having a first leg and a second leg coupled to said table and being extendable inwardly and outwardly for creating a stable supporting position when said legs are outwardly extending and for allowing said respective pair of legs to be stored within said periphery in said storage position when said legs are inwardly extending; and
   a strut having a first end pivotally attached to said table and a second end pivotally attached to one of said first and second pairs of legs for maintaining said respective pair of legs in said supporting position.

2. An assembly as set forth in claim 1 further comprising a foldable linkage interconnecting said first and said second legs for permitting a pivoting movement between said outwardly extending supporting position and said inwardly extending storage position.

3. An assembly as set forth in claim 1 further comprising a support rotatable about a connecting axis and extending between said first and said second legs rotatably attaching said legs to said table.

4. An assembly as set forth in claim 3 further comprising first and second pivots coupled to said support and pivotally connecting said first and said second legs respectively to said support for extending inwardly and outwardly.

5. An assembly as set forth in claim 2 wherein said foldable linkage further comprises a first link and a second link pivotally attached to said first leg and said second leg respectively.

6. An assembly as set forth in claim 5 wherein said foldable linkage further comprises a fastener pivotally connecting said first link and said second link.

7. An assembly as set forth in claim 2 wherein said strut is further defined as attached to said foldable linkage for maintaining said respective pair of legs in said supporting position.

8. An assembly as set forth in claim 1 further comprising a leg lock associated with each pair of legs coupled to said table for maintaining said pair of legs in said storage position.

9. An assembly as set forth in claim 1 wherein said periphery is further defined as a first rail and a second rail spaced from said first rail.

10. An assembly as set forth in claim 9 further comprising cross-members interconnecting said first and said second rails.

11. An assembly as set forth in claim 1 further comprising a pair of struts each attached to one of said first and second pairs of legs for maintaining said respective pair of legs in said supporting position.

12. An assembly as set forth in claim 1 further comprising a handle coupled to said table for transporting said assembly in said storage position.

* * * * *